(12) United States Patent
Chen et al.

(10) Patent No.: US 7,751,322 B1
(45) Date of Patent: Jul. 6, 2010

(54) PROCESSING NETWORK PACKETS USING FRACTIONAL TIME STAMP VALUES

(75) Inventors: Li-Sheng Chen, Petaluma, CA (US); Dziem Dinh Nguyen, Petaluma, CA (US); Qian-Yu Tang, Petaluma, CA (US); Huadong Shao, Rohnert Park, CA (US)

(73) Assignee: DinoChip, Inc., Petaluma, CA (US)

( * ) Notice: Subject to any disclaimer, the term of this patent is extended or adjusted under 35 U.S.C. 154(b) by 0 days.

(21) Appl. No.: 12/046,638

(22) Filed: Mar. 12, 2008

Related U.S. Application Data

(63) Continuation of application No. 10/710,172, filed on Jun. 23, 2004, now Pat. No. 7,352,697.

(51) Int. Cl.
*G08C 15/00* (2006.01)

(52) U.S. Cl. ...................................... 370/230

(58) Field of Classification Search ................. 370/230; 709/224
See application file for complete search history.

(56) References Cited

U.S. PATENT DOCUMENTS

| | | | |
|---|---|---|---|
| 4,488,289 A | 12/1984 | Turner | |
| 5,327,557 A | 7/1994 | Emmond | |
| 5,563,885 A | 10/1996 | Witchey | |
| 5,636,210 A | 6/1997 | Agrawal | |
| 5,659,755 A | 8/1997 | Strohacker | |
| 6,016,466 A | 1/2000 | Guinther et al. | |
| 6,064,674 A | 5/2000 | Doidge et al. | |
| 6,115,360 A | 9/2000 | Quay et al. | |
| 6,122,337 A | 9/2000 | Bleiweiss et al. | |
| 6,205,151 B1 | 3/2001 | Quay et al. | |
| 6,205,470 B1 | 3/2001 | Madden et al. | |
| 6,341,193 B1 | 1/2002 | Schipper | |
| 6,529,508 B1 | 3/2003 | Li et al. | |
| 6,553,002 B1 | 4/2003 | Bremer et al. | |
| 6,628,653 B1 | 9/2003 | Salim | |
| 6,651,099 B1 | 11/2003 | Dietz et al. | |
| 6,701,469 B1 | 3/2004 | Matter et al. | |
| 6,741,565 B1 | 5/2004 | Wicklund | |
| 6,829,218 B1 | 12/2004 | Chen et al. | |
| 7,042,883 B2 * | 5/2006 | Fan et al. | 370/395.4 |
| 7,224,669 B2 | 5/2007 | Kagan et al. | |
| 7,245,585 B2 | 7/2007 | Sullivan et al. | |
| 7,444,398 B1 * | 10/2008 | Matthews | 709/224 |

\* cited by examiner

*Primary Examiner*—Ricky Ngo
*Assistant Examiner*—Chandrahas Patel
(74) *Attorney, Agent, or Firm*—Aka Chan LLP

(57) ABSTRACT

Fractional or fuzzy time stamp values are used during processing network traffic. Handling fractional time stamp values permits scaling down of time stamp values, so that fewer bits, and memory, are needed to store each fractional time stamp value. According to a specific technique, departure times are set based on a quantity X plus Y/Z, where X is an integer, Y is a numerator, and Z is a denominator. The departure times are synchronized with the ideal departure times after ($Z*X+Y$) time units. A technique is provided to reduce cell delay variation.

20 Claims, 12 Drawing Sheets

Part1:

1/Ri Fraction Problem $$\frac{1}{R_k} = \frac{\text{Connection k bandwidth}}{\text{Port i bandwidth}}$$

$$\begin{cases} TS1 = RT + 1/R1 = RT + 5/2 \\ TS2 = RT + 1/R2 = RT + 10/3 \\ TS3 = RT + 1/R3 = RT + 32 \end{cases}$$

Needs 5 bits to represent 1/R3

Scale Up Factor = 2 * 3 = 6 ⟹

$$\begin{cases} TS1' = RT' + 15 \\ TS2' = RT' + 20 \\ TS3' = RT' + 192 \end{cases}$$

Need 8 bits to present 1/R3
Will increase the bits need to represent 1/Ri and timestamp

US 7,751,322 B1

PROCESSING NETWORK PACKETS USING FRACTIONAL TIME STAMP VALUES

CROSS-REFERENCE TO RELATED APPLICATION

This patent application is a continuation of U.S. patent application Ser. No. 10/710,172, filed Jun. 23, 2004, which is incorporated by reference.

BACKGROUND OF THE INVENTION

The present invention relates generally to the field of computer and data networking, and more particularly, to techniques to more efficiently representing time stamp information for network processing.

Computer networking is one of the most important technologies in the information age. Personal computers are on the desks of most business people and majority of homes in the United States, and also becoming more commonplace throughout the world. Computers are instrumental for facilitating electronic commerce and internet traffic.

Integrated circuits are the building blocks of electronic devices and networks, including computers, personal digital assistants (PDAs), mobile and other telephony devices, digital cameras and video cameras, digital voice recorders, routers, switches, and network hubs. Some types of integrated circuit include microprocessors, memories, programmable logic devices (PLDs), and application specific integrated circuits (ASICs). As integrated circuit technology improves, it becomes possible to put more and more functionality on a single integrated circuit.

Computers are typically connected using a network that allows the sharing or transfer of data between computers and devices. This data may include computer files, e-mail, images, audio, video, real-time data, and other types of information. For example, when their computers are joined in a network, people can share files and peripheral such as modems, printers, tape backup drives, or CD-ROM drives. When networks at multiple locations are connected, people can send e-mail, share links to the global internet, or conduct videoconferences in real time with other remote users. Local area network (LANs) are used to connect computers within businesses and homes. The internet is typically used to connect individual computers and other networks, including local area networks.

Each computer has a set of predefined network ports, which act as mailboxes for incoming and outgoing messages. The ports are typically configured to support a particular network protocol, and hence to receive or send a type of packet that is compatible with the protocol. For example, one common port is the UDP (user datagram protocol) port, which provides a channel into the computer for datagram packets that are communicated using TCP/IP (transport control protocol/internet protocol). Datagram packets are sent to a specific UDP port by using a programming interface, such as "sockets." Sockets are a programming interface originated on Unix operating systems that allows network communication using a file I/O metaphor.

Despite the success of computer networks, there is a continuing need to improve networking technology, especially since network traffic continues to rapidly grow. For example, it is desirable to increase transmission speed and network processing speed. Further, time stamps are frequently used in the processing of network packets or other transmission of data. Time stamps are important because they are used in numerous aspects of network processing. For example, time stamps are used in implementing queues or other techniques to prioritize processing of data based on when the data is received. Time stamps are used to synchronize information between two different locations. As can be appreciated, time stamps are also used in many aspects of the processing of computer, binary, or network data.

As the bandwidth increases and the amount of network increases and the amount of data increases, the time stamps generally get larger, and thus require more bits to be represented. More bits means that more memory is required to store these time stamps. This will require more space on an integrated circuit or greater number of integrated circuits. Conserving memory is an important aspect in network processing because then more can be done within a single chip or fewer chips. Therefore, it is desirable to reduce the amount of memory needed to store time stamp information.

As can be appreciated, there is a need for improvements in computer networking, especially for techniques to improve the handling time stamp information.

BRIEF SUMMARY OF THE INVENTION

The invention provides a technique for handling fractional or fuzzy time stamp values. Handling fractional time stamp values permits scaling down of time stamp values, so that fewer bits, and memory, are needed to store each fractional time stamp value. According to a specific technique, departure times are set based on a quantity X plus Y/Z, where X is an integer, Y is a numerator, and Z is a denominator. The departure times are synchronized with the ideal departure times after $(Z*X+Y)$ time units. A technique is provided to reduce cell delay variation.

The technique of the invention allows the sorting of fractional number in network processing. The technique can be used to reduce the time stamp bits needed to represent large granularity sorters. The technique may be combined with other network sorter approaches, including the integrated multiple dimensional sorter (IMDS) discussed in Ser. No. 10/125,686, filed Apr. 17, 2002, which is incorporated by reference. The principles of the invention may be applied to representation of numbers other than time stamps and in applications other than network processing. Fractional values as time stamps in network processing are provided merely as an application of the principles of the invention.

In an embodiment, the invention is a method including providing a scale-down factor Z, providing a first time stamp expression for a first connection, and providing a second time stamp expression for a second connection. The first time stamp expression is scaled down using the scale-down factor Z, where the first time stamp expression becomes fractional and includes a quantity X plus Y/Z, where X is an integer, Y is a numerator, and Z is a denominator. The second time stamp expression is scaled using the scale-down factor Z. The first connection uses a network port for Z time periods having a total of $(Z*X+Y)$ time units.

The network port may be a DS-3, OC-3, OC-12, or OC-48 port connection. In an embodiment, at least one of the Z time periods has X time units. In another embodiment, at least Y of the Z time periods has X time units and one of the Z time periods has $(X+Y)$ time units. An ideal time period has $X+Y/Z$ time units, and the ideal time period is a fractional quantity of times. The first time stamp expressions synchronize every with the ideal time period every $(Z*X+Y)$ time units. A maximum cell delay variation is given by at least one of $(Z-1)*Y/Z$ or $((Z-1)*(X+Y/Z))-((Z-1)*Z*X)$. The scale-down factor Z may be user selectable or programmable and nonzero. When Z is greater than 2, and Y is 2 or greater, one of the Z time periods has X time units, and Y of the Z time periods has X+1 time units. The second time stamp fraction may not be fractional.

In another embodiment, the invention is a method including providing a fractional time stamp expression and allocating a network port to a connection for X blocks of time based on the fractional time stamp expression. The quantity X is at least two. A first of the X blocks has M time units, a second of the X blocks has N time units, and M is not equal to N.

One time unit may be given by one cell size divided by a bandwidth of the network port. A number of bits used to represent the fractional time stamp expression will be a logarithm, base 2, of a bandwidth of the network port divided by a selected granularity.

In another embodiment, the invention is a system comprising a port, a number of connections, each capable of connecting to pass data to the port, and a controller, where the controller connects a first connection of the connections to the port for a time period which is based on a fractional time stamp value. As discussed, the port may be a DS-3, OC-3, OC-12, or OC-48 port connection. A first time the first connection is connected to the port has a time period different from that for a second time the first connection is connected to the port.

The controller may perform sorting using the fractional time stamp value. The system may allow the fractional time stamp value to be derived by scaling down a corresponding nonfractional time stamp value by a user-selected factor. The fractional time stamp value may be represented using fewer binary bits than the corresponding nonfractional time stamp value.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
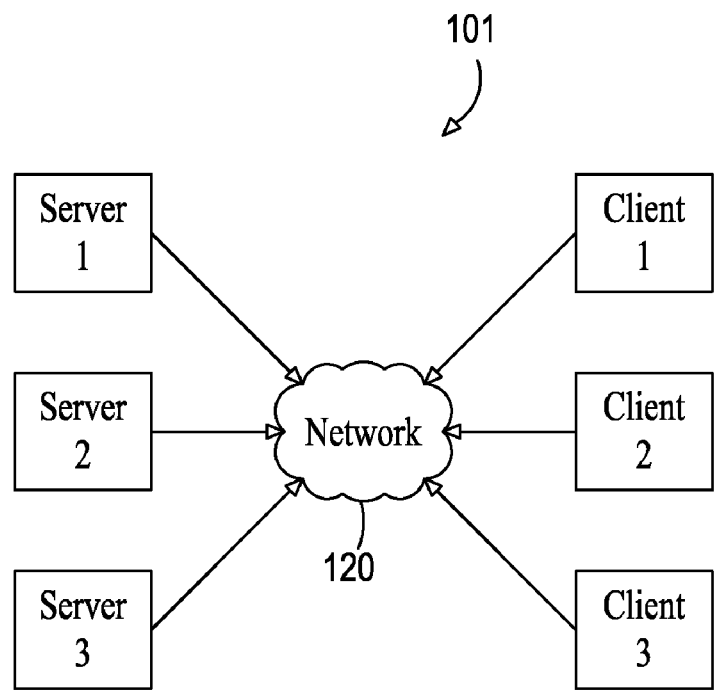
FIG. 1 shows a computer network system within which the present invention may be embodied.

FIG. 1 shows a computer network system 101 within which the present invention may be embodied. There may be any number of servers and clients in the system. For example, there may be thousand or even millions of servers and clients. In this system, there are three servers, server 1, server 2, and server 3, and there are three clients, client 1, client 2, and client 3. The servers communicate with the clients by exchanging packets over a network 120. The computer network system is representative of many different environments including a LAN system, a wide area network (WAN) system, and an internet system.

A network generally includes (1) at least two computers, (2) a network interface or network interface card (NIC) on each computer, (3) a connection medium, and (4) network operating system software. The NIC is a device that lets the computer talk to the network. The connection medium is usually a wire or cable, although wireless communication between networked computers and peripherals is also available. Some examples of network operating systems software include Microsoft Windows 95 or Windows NT, Novell NetWare, AppleShare, or Artisoft LANtastic.

Most networks include a hub or switch. Hubs, or repeaters, are simple devices that interconnect groups of users. Hubs forward any data packets—including e-mail, word-processing documents, spreadsheets, graphics, print requests—they receive over one port from one workstation to all their remaining ports. All users connected to a single hub or stack of connected hubs are in the same "segment," sharing the hub bandwidth or data-carrying capacity. As more users are added to a segment, they compete for a finite amount of bandwidth devoted to that segment.

Switches are smarter than hubs and offer more dedicated bandwidth to users or groups of users. A switch forwards data packets only to the appropriate port for the intended recipient, based on information in each packet header. To insulate the transmission from the other ports, the switch establishes a temporary connection between the source and destination, and then terminates the connection when the conversation is done.

A router links a local network to a remote network. On the internet, a router is a device or, in some cases, software in a computer, that determines the next network point to which a packet should be forwarded toward its destination. The router is connected to at least two networks and decides which way to send each information packet based on its current understanding of the state of the networks it is connected to. A router is located at any gateway (where one network meets another), including each Internet point-of-presence. A router is often included as part of a network switch.

A router may create or maintain a table of the available routes and their conditions and use this information along with distance and cost algorithms to determine the best route for a given packet. Typically, a packet may travel through a number of network points with routers before arriving at its destination. Routing is a function associated with the network layer (layer 3) in the standard model of network programming, the Open Systems Interconnection (OSI) model. A layer-3 switch is a switch that can perform routing functions.

Figure 2:
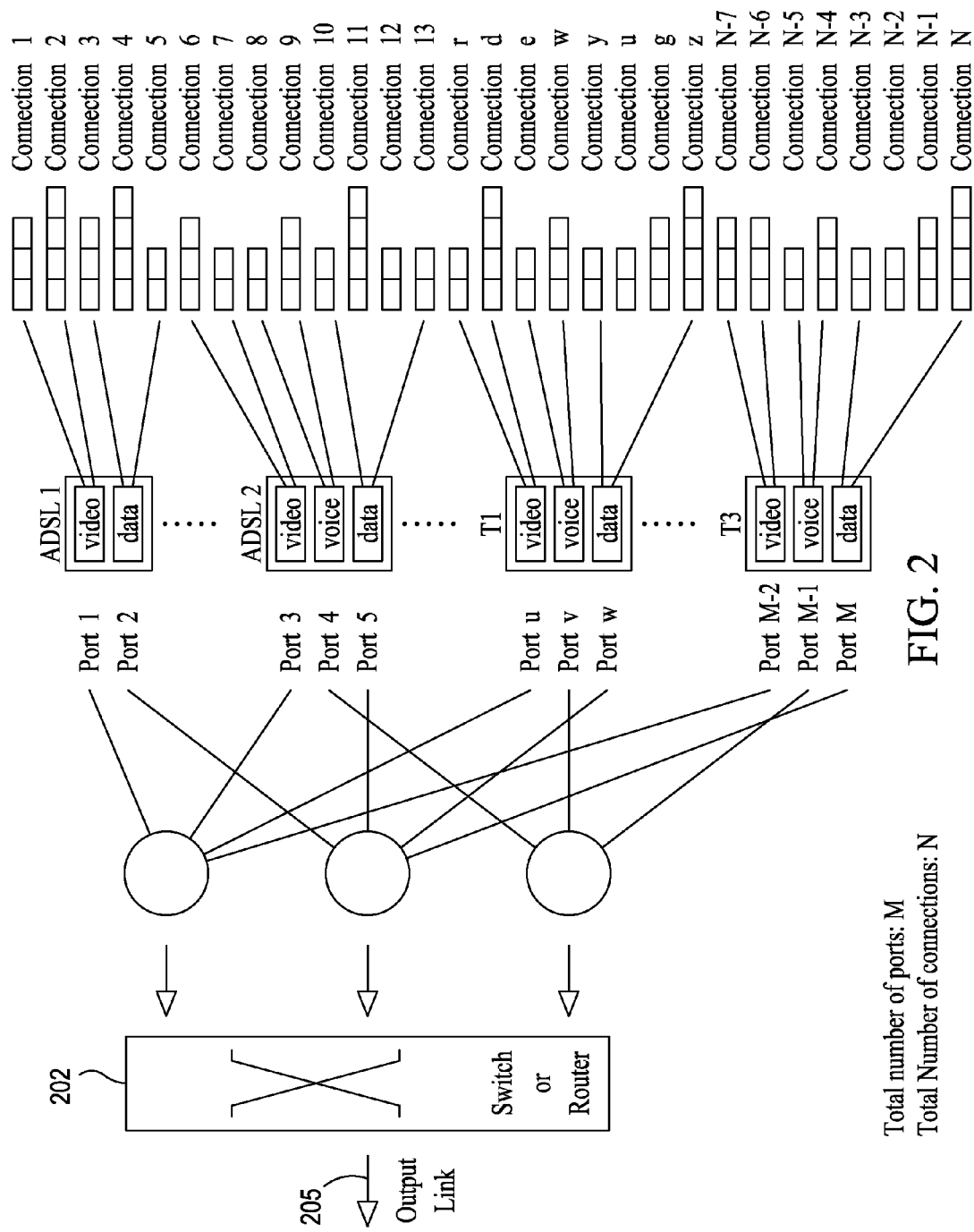
FIG. 2 shows a switch or router used to connect a number of ports and connections to a network.

FIG. 2 shows a switch or router 202 used to connect a number of ports and connections to a network, such as network 120, using an output link 205. ADSL, T1, and T3 are some examples of types of broadband connections. Each port may be allocated for a particular type of information such as video, voice, or data. There are M total ports (may also referred to as a sorters in this document) and N total connections (may also be referred to as entries in this document). M and N are integers. The ports are numbered 1 through M, and the connections are numbered 1 through N. Each port has a number of connections associated with it. Specifically, port I has N(I) connections. So, port 1 has N(1) connections, which is two; port 2 has N(2) connections, which is 3; and port M has N(M) connections.

Each connection or entry stores the information of a packet. This connection data may be held in a memory such as a random access memory (RAM) or pointer memory data structure. This data includes the packet information and a time stamp of the packet. The time stamp gives the time that the packet was received. The format of the time stamp, whether integer, floating point, or other format is important in factor in determine how much memory is used. For example, if the time stamp is an integer value from 0 to 256, this would require 8 bits per time stamp. And if the time is an integer from 0 to 65,536, this would require 16 bits per time stamp. Since there are many packets and a single time stamp for each entry, more memory is used when the time stamp has a greater number of bits. An aspect of the invention is to reduce the amount of memory used by storing the time stamp information. This may also improve speed because there less memory or data needs to be manipulated when processing the time stamps.

The packet information may also be referred to as packet data, connection value, or payload. In operation, many packets are received at a port at different times and these will be stored in entries. The packets in the entries will then be passed out of the port. There are various techniques to prioritize which entries are sent out first. Generally, the earlier received packets are sent out first. So, the packets with the lowest time stamp will be sent out first. The packet with the minimum time stamp has the highest priority. Other priority schemes may also be used. For example, in the alternative, the most recently received packets may be sent out first. In this case, the packets with the highest time stamp will be sent out first.

To implement such priority schemes, the entries for a particular port are sorted by time stamp to determine which time stamps will be sent out of the port first. To prioritize to send out earliest received entries first, the entries will be sorted so time stamps are from lowest to highest. Each port is sorted individually, which means the entries for port 1 will be sorted independently of port 2 and the other ports. And the entries in port 2 will be sorted independently of port 1 and the other ports. Therefore, each port may be referred to as a sorter because the entries associated with a particular sorted are sorted independently of the other sorters.

Some sorting techniques are binary tree and heap sort. Other sorting algorithms may also be used. Sorting the entries will typically take several memory cycles to complete. Some sorting techniques are discussed in U.S. patent application Ser. Nos. 10/125,686, filed Apr. 17, 2002, and 10/737,461, filed Dec. 15, 2003, which are incorporated by reference. This invention may be used with the sorting techniques discussed in these applications, such as an integrated multiple dimension sorter (IMDS) of U.S. patent application Ser. No. 10/125,686. When the fractional time stamp of invention is used in connection with an integrated multiple dimension sorter, the technique may be referred to as a fuzzy multiport sorter (FMPS). Furthermore, the invention may be embodied in a digital signal processor (DSP) traffic management system as discussed U.S. patent application Ser. No. 10/708,503, filed Mar. 8, 2004, which is incorporated by reference.

In an implementation of the invention, the number of ports or connections, or both, is user-selectable. For example, a user may configure or program the device to have one port, two ports, three ports, or four ports or more. Furthermore, the user may also configure or program the device to have three connections in the first port, two connections for the second port, or any number of connections for a specific port that is permitted by the design. There are different techniques of designing a device to allow for user-configurability. For example, a user may configure the device by placing the appropriate signals at particular pins or by loading the appropriate bits into flip-flops, registers, storage, or memory cells of the device. Perhaps electrically erasable (EEPROM) or Flash memory cells may be used to allow for nonvolatile storage of the user's configuration. Or static RAM (SRAM) or dynamic RAM (DRAM) cells may be used to allow for volatile storage of the user's configuration.

There may be any number of connections, which may be user selectable, assigned to each port. For example, port 1 of FIG. 2 is for ADSL 1 video and has two connections, connection 1 and 2. Port w is for T1 data and has four connections, connections y, u, g, and z. In an implementation, the total number of connections N may be divided in any desired way among the ports. For example, if N is 64K and there are two ports, if port 1 has 25 connections, then port 2 may have at most 64K-25 connections.

Generally, the number of ports a user selects will depend on the number of devices a user will be using. The number of connections will generally be allocated according to bandwidth, where the greater bandwidth ports will have more connections. For example, a T1 video connection has greater bandwidth than an ADSL voice connection, and therefore will usually have a greater number of connections. As can be appreciated, as N and M increase, the circuitry to implement the sorters and entries becomes more complicated.

Alternatively, in another implementation of the invention, rather than user-selectability, a device may be designed with fixed number of ports and connections, and the user may choose to not use all the available ports and connections. In another implementation, the features such as the number of ports and connections of the device may be configured by selecting the appropriate masks during fabrication. This may be referred to as factory programmability.

Figure 3:
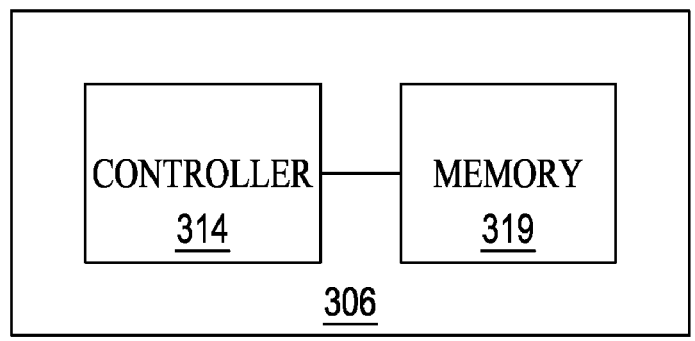
FIG. 3 shows an integrated circuit or chip with a controller or control circuitry portion and memory portion.

The ports (sorters) and connections (entries) may be implemented using one or more integrated circuits. In one embodiment, the sorters and entries are implemented using a single integrated circuit. FIG. 3 shows an integrated circuit or chip 306 with a controller or control circuitry portion 314 and memory portion 319. The control circuitry is connected to the memory. The control circuitry implements the sorters and entries while the memory provides the storage for the time stamps and entries. For example, the control circuitry would implement the user-selectability feature of the number of sorters and entries. In an embodiment of the invention, M is at least two, so there are two or more sorters on a single integrated circuit. The integrated circuit may be a programmable logic device (PLD) or field programmable gate array (FPGA) or ASIC, DSP, or a custom-designed integrated circuit.

In an alternative implementation, the controller 314 and memory 319 are on separate integrated circuits. Integrated circuits 314 and 319 could be connected using traces of a PC board or may be a wire or cable. The integrated circuits may be on different electronic boards or even in different locations, being connected by a network or modem. The memory may be, for example, a static RAM (SRAM) or dynamic RAM (DRAM) integrated circuit, a memory integrated with a combination of memory technologies. The memory may also be a fixed disk or other magnetic storage, or electrically erasable (EEPROM) storage. However, disk drive technology has generally slower access times than integrated circuit memories and therefore would not be used in a higher performance implementation.

Figure 4:
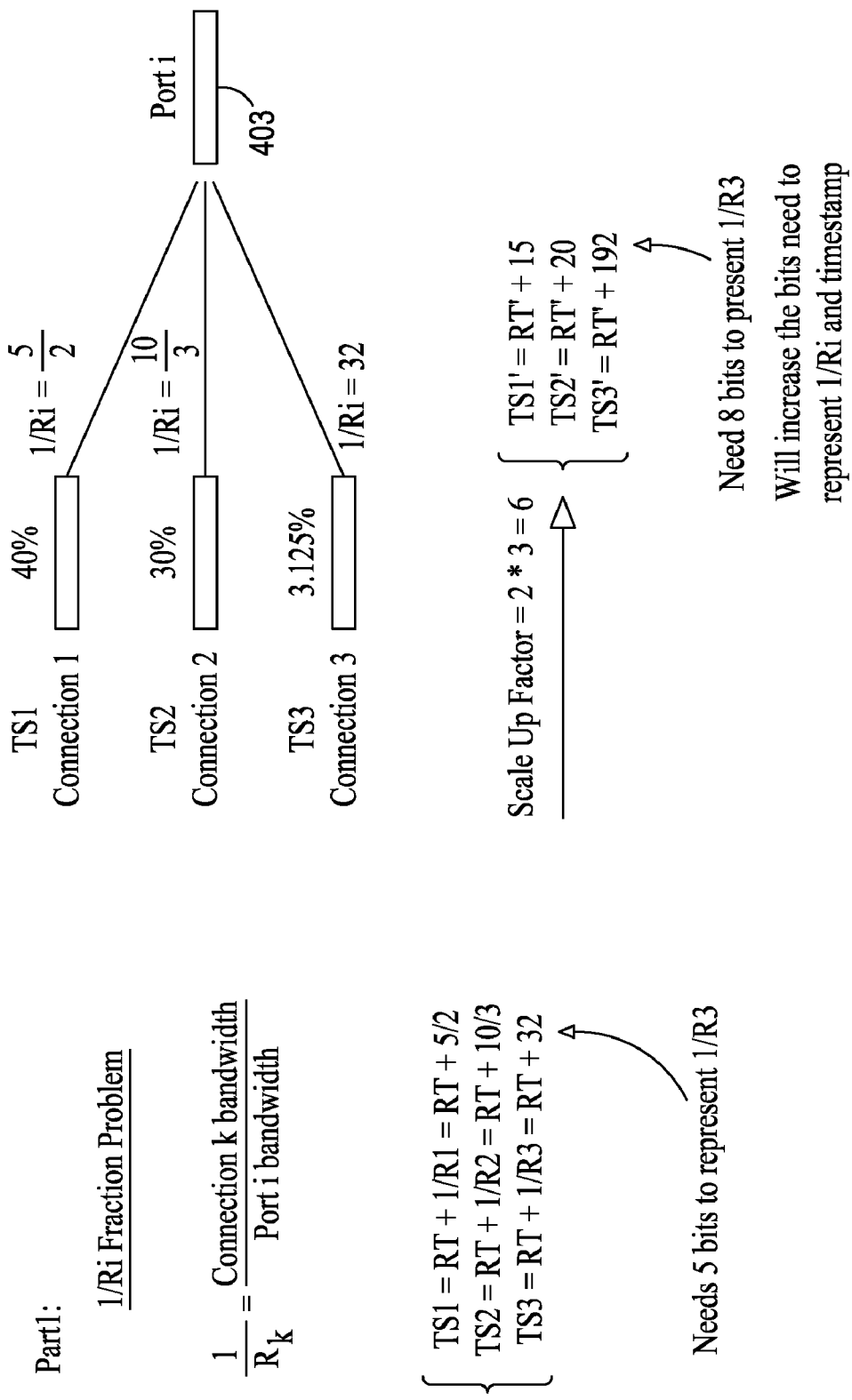
FIG. 4 shows diagram of a technique of handling of fractional or fuzzy time stamps in network routing.

FIG. 4 shows diagram of a technique of handling of fractional or fuzzy time stamps in network routing. As an illustrative example, there is a port i 403 through which three connections, connection 1, connection 2, and connection 3 can pass data. For example, a port may have a bandwidth of 10 megahertz. As discussed above, there may be any number of ports in a network system and any number of connections. There may be more or less than three connections per port. And a port may have any bandwidth more or less than 10 megahertz, such as 5 megahertz, 100 megahertz, 300 megahertz, 700 megahertz, 1 gigahertz, and 10 gigahertz.

Each connection has a different 1/Rk factor, which is the inverse of the normalized bandwidth or connection k bandwidth divided by port i bandwidth. For example, connection 1 has a 1/Ri of 5/2, connection 2 has a 1/Ri or 10/3, and connection 3 has a 1/Ri or 32. Transferring packets out of the port is according a cell slot concept. There is a schedule of the next time packets from a connection may use the port.

A time stamp or order number is used to track the packets, and their scheduled departure time. TS1 is a time stamp for connection 1, TS2 is a time stamp for connection 2, and TS3 is a time stamp for connection 3. TS1 is given by RT plus 1/R1, which is RT plus 5/2. TS2 is given by RT plus 1/R2, which is RT plus 10/3. And, TS3 is given by RT plus 1/R3, which is RT plus 32. RT may be real time, arrival time, departure time, or any other desired time number.

In order to represent a time stamp which is a fractional number, a scale-up factor is used. In this case, the lowest common denominator (LCD) scale-up factor of 6 is used. But the scale-up factor may be any number to so that the time stamps are no longer fractional. This scale-up factor is multiplied with the TS1, TS2, and TS3 numbers to obtain non-fractional time stamps. For example, TS1' is RT' plus 15. TS2' is RT' plus 20. TS3' is RT' plus 192.

By using a scale-up factor to remove the fractional time stamp values, this increases the number of bits needed to represent the time stamp. For example, 8 bits are needed to represent the 1/R3 of 192, when the scale-up factor is 192. This increases the amount of memory that is used to store time stamps and increase the sorter complexity. If larger scale-up factors are used, even more bits will be required to represent the 1/Ri number, and consequently more memory.

Figure 5:
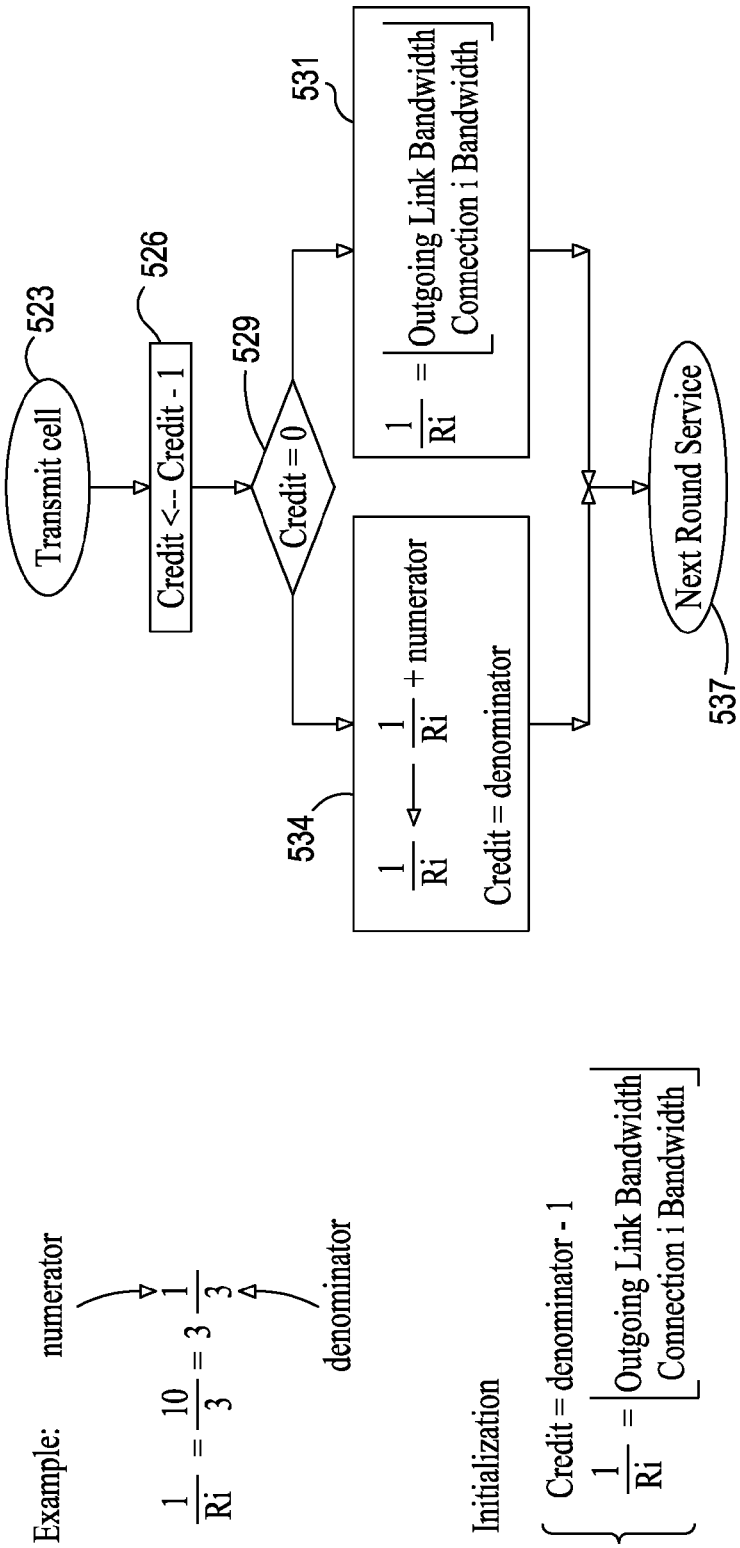
FIG. 5 shows a flow diagram of one technique of handling fractional time stamps.
Figure 6:
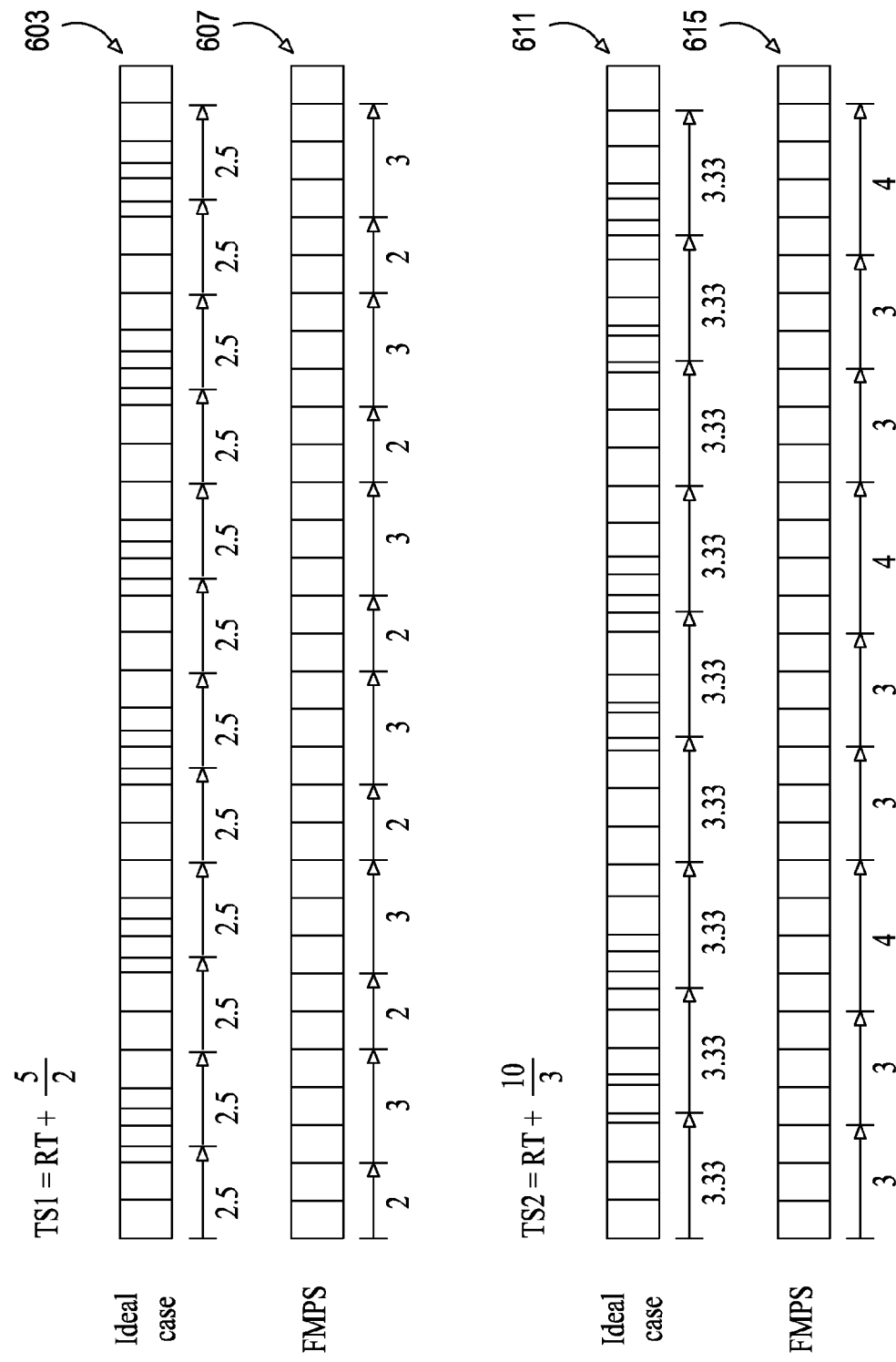
FIG. 6 shows a timing diagram of applying the technique of previous figure to some fractional time stamps.

FIG. 5 shows a flow diagram of one technique of handling fractional time stamps. This technique may be referred to as a fuzzy time stamp technique. FIG. 6 shows a timing diagram of applying the technique of FIG. 5 to some fractional time stamps. This flow diagram is provided as merely an illustrative example of one technique according the principles of the invention. There are many other techniques and variations of techniques of handling fractional time stamps, too numerous to discuss here, but all based on the principles of the invention.

In FIG. 6, departure times for TS1 and TS2 are shown. TS1 is a fractional time stamp expression RT plus 5/2, and TS2 is RT plus 10/3. Four timing diagrams, 603, 607, 611, and 615 provided. FIG. 6 shows the fuzzy time stamp of the invention being applied to a fuzzy multiport sorter (FMPS) for network processing. However, in addition to FMPS, the fuzzy time stamp of the invention may be used in many other applications. Each timing diagram is divided into a number blocks 617, each representing a unit of cell time. The value of each cell time may be any timing value. For example, each cell time may be a 1 nanosecond, 2 nanoseconds, 5 nanoseconds, 10 nanoseconds, 50 nanoseconds, 1 millisecond, 5 milliseconds, 1 second, or other time quantities.

Timing diagram 603 shows a schedule of ideal departure times for TS1. Timing diagram 611 shows a schedule of ideal departure times for TS2. The departure time is when time is allocated for a particular connection to the port. An inverse of the bandwidth will give the departure time. Since TS1 has a fractional component 5/2, the ideal departure time is every 2.5 cell time units. Since TS2 has a fractional component 10/3, the ideal departure time is every 3.33 cell time units. However, departure times can only be scheduled at whole units of cell times and fractional cell times are not permitted.

The flow diagram of FIG. 5 shows a technique of handling fractional time stamps. Timing diagrams 607 and 615 show an application of this technique to time stamps TS1 and TS2. According to the technique, the value 1/Ri will be factored so it is no longer an improper fraction. To change an improper fraction into a mixed number, divide the numerator by the denominator. The remainder is the numerator of the fractional part.

For example, when 1/Ri is 10/3, this will be factored into 3⅓, which is a mixed number (i.e., having a whole number part and a fractional part). For the technique of the invention, the numerator will be 1 and the denominator will be 3.

To initialize, a variable "credit" will be the denominator minus 1. For 3, the credit will be 2. And 1/Ri will be the outgoing link bandwidth divided by the connection i bandwidth. To begin the flow of transmitting a cell 523, credit is decremented by one 526. If credit is not 0 (step 529), 1/Ri will be the outgoing link bandwidth divided by the connection i bandwidth (step 531). If credit is 0, 1/Ri will be 1/Ri plus the numerator (step 534). And credit will be the denominator (step 534). Then the technique continues in a similar fashion for next round of service (step 537).

Timing diagram 607 illustrates an application of this technique for TS1. For 5/2, this is converted to 2½. Upon initialization, credit is 1. After a start time, credit will be decremented to 0, and the first departure time will be given by the denominator or 2. Credit will then be set to 2. For the next departure time, credit will be decremented to 1, and the second departure time will be 3. As can be seen, according to the technique, the next departure time will be 2, then 3, and alternates between 2 and 3. As can be appreciated, the technique may be modified so it alternates between 3 and 2 instead of 2 and 3.

Note how after every 2 cycles (given by the denominator), the timings of the ideal (603) and the technique of the invention (607) are synchronized. That is, two 2.5 time periods for the ideal case is equivalent to the 2 and 3 time periods of the timing of the present invention because 5 time units have taken place. The degree of difference in timing between the ideal case and the timing of the invention may be referred to as the degree of granularity.

Timing diagram 615 illustrates an application of this technique for TS2. According to the technique, the departure times will be a cycle of 3, 3, and 4. As can be appreciates, the technique may be modified so it alternates between any combination of 3, 3, and 4, such as 4, 3, and 3 and 3, 4, and 3.

For every 3 cycles (given by the denominator), the timing 615 synchronizes with the ideal case 611. Since it takes longer, every 10 time units, for the ideal case and fuzzy case to be synchronized, the TS1 case has better granularity then the TS2 case.

Therefore, with the fuzzy time stamp technique of the invention, one may allocate the bandwidth of network while using fewer time stamp bits. The fuzzy time stamps may be used to determine departure time for data through ports of the network. The sorter can use this fuzzy time stamp technology to keep the same granularity while keeping fewer time stamp bits. The time period to synchronize the ideal case and fuzzy case will be given by the denominator of the 1/Ri value.

Figure 7:
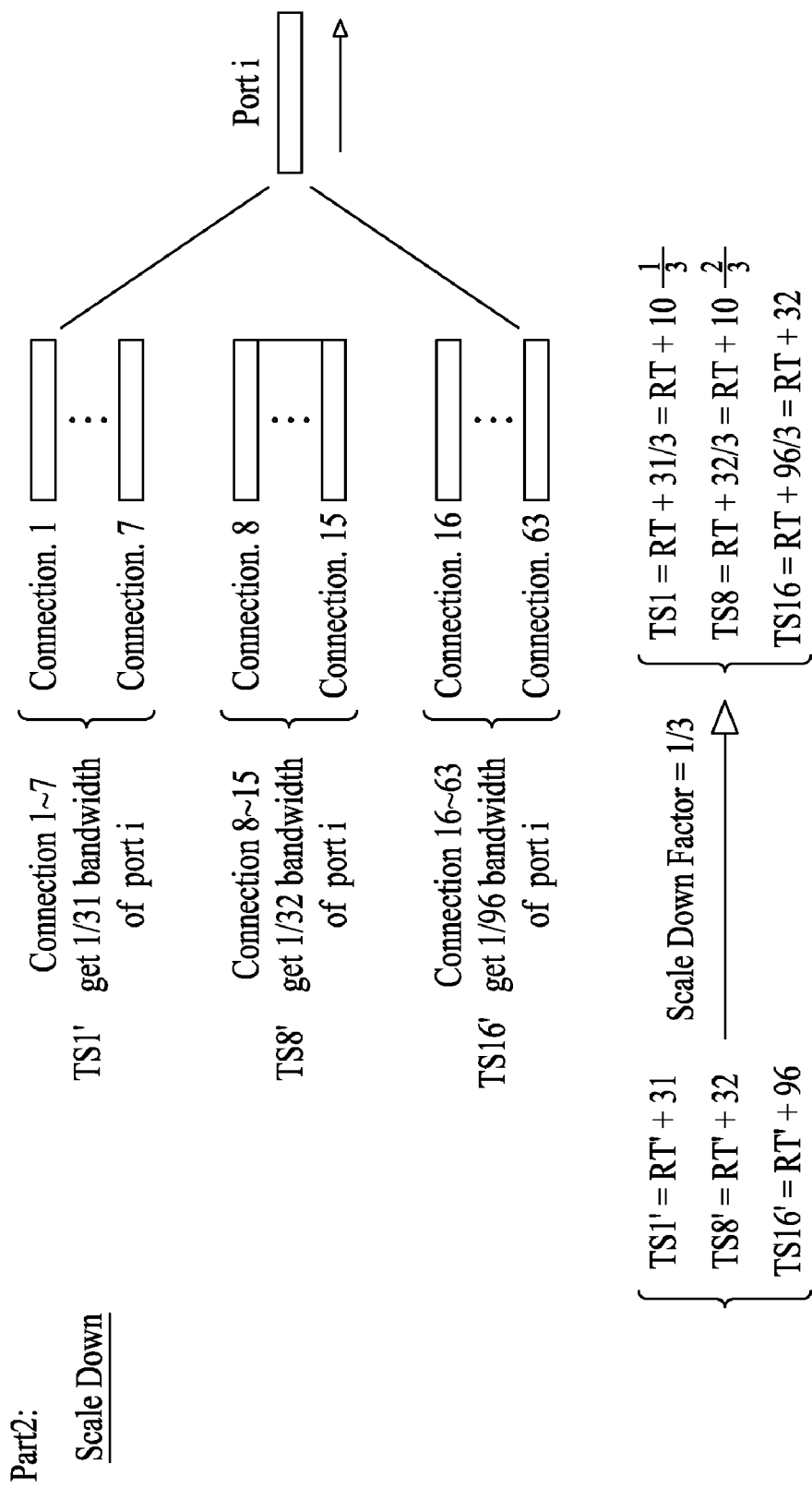
FIG. 7 shows using a scale down factor on time stamp values in order to reduce the number of time stamp bits.

As shown in FIG. 7, in an aspect of the invention, a scale down factor is used on time stamp values in order to reduce the number of time stamp bits. TS1' is for connections 1 to 7 and they get 1/31 of the bandwidth of port i. TS8' is for connections 8 to 15 and they get 1/32 of the bandwidth of port i. TS16' is for connections 16 to 63 and they get 1/96 of the bandwidth of port i. TS1' is RT' plus 31. TS8' is RT' plus 32. TS16' is RT' plus 96. To represent 96, it would take 7 bits.

In the invention, a scale-down factor is selected to reduce the time stamp bits needed. In this example, a scale down factor of 1/3 is selected. Depending on the specific application, other scale down factors may be selected such as 1/2, 1/4, 1/5, 1/10, and others. In an embodiment of the invention the scale down factor is a programmable value. This programmable value may be selected by a user or customer. Note that as denominator of the scale down factor increases, this increases the granularity because there is a longer period between when the fuzzy time stamp approach timing and ideal case timing are synchronized.

The scale-down factor is described above is a fraction (e.g., 1/2 or 1/3) and this value is multiplied with the time stamp expression. However, as one will recognize, the scale-down factor may be expressed or represented as an integer (e.g., 2 or 3), and the time stamp expression will be divided by this integer. The scale-down factor is a factor that is used to reduce the number of bits of the time stamp expression.

Figure 8:
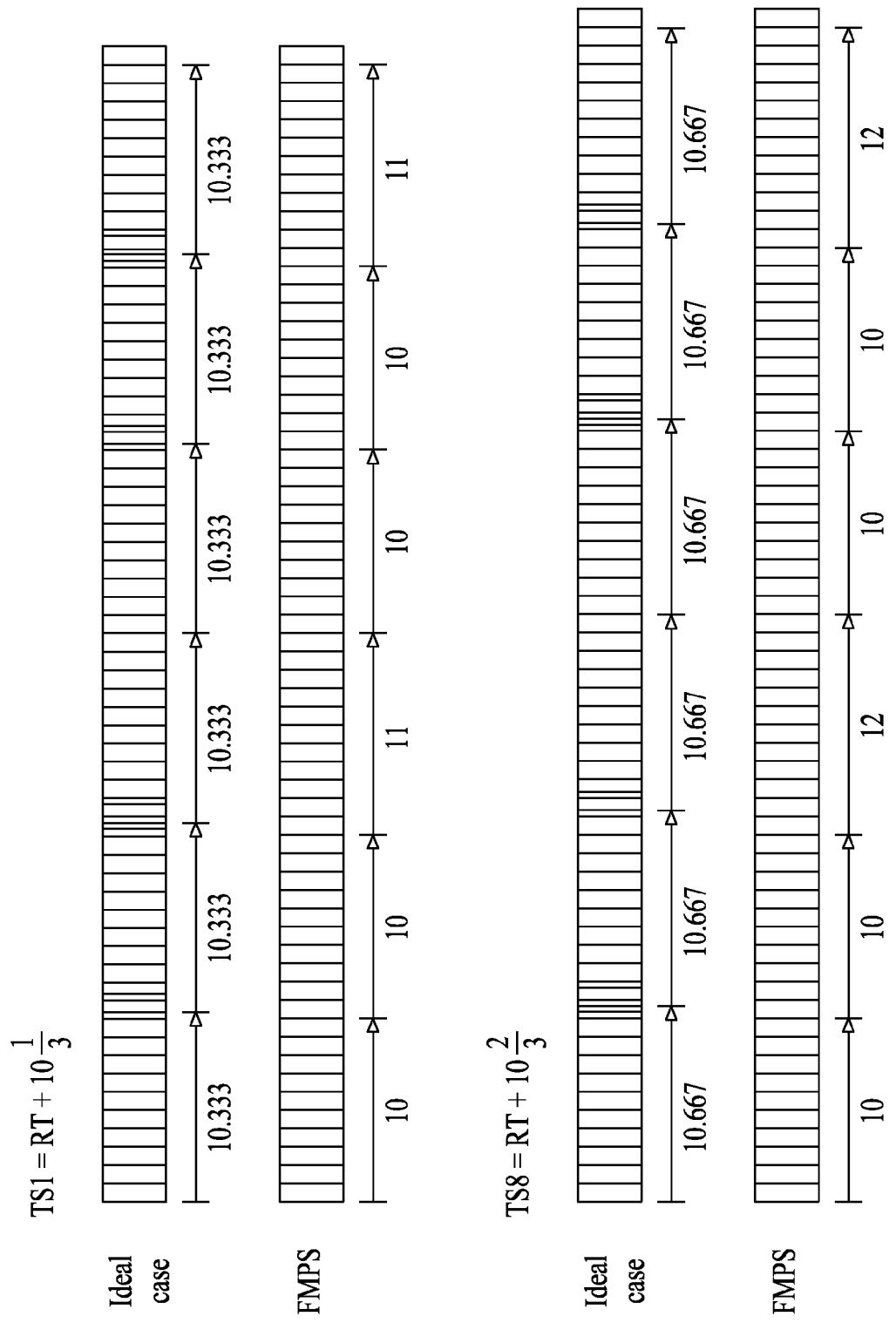
FIG. 8 shows timing diagrams for two time stamp expressions.

FIG. 8 shows timing diagrams for TS1 and TS8 of FIG. 7. The ideal and fuzzy time stamp timings are provided. For TS1, according to a technique of the invention, the fuzzy time stamp timings rotate between 10, 10, and 11. For TS8, the fuzzy time stamp timings rotate between 10, 10, and 12. Other timings may be used based on the principles of the invention. For example, any combination of these timings may be used. For TS1, the timings may be 11, 10, and 10 or 10, 11, and 10. For TS8, the timings may be 12, 10, and 10 or 10, 12, and 10.

Furthermore, in a further technique of the invention, the invention may further improve granularity in cases when improvement is possible. For example, in the TS8 case, there is a time period 12, where one time cycle may be allocated to another of the periods. In embodiment, the invention may provide a timing of 10, 11, and 11, and combinations of these. The invention will allocate whole unit departure times among the 32 available time units. This technique of reducing granularity may be referred to as a reducing cell delay variation (CDV) approach.

Other possible timing possibilities for 32 time units include 8, 8, and 16, and other timing combinations where the total number of time units will be 32. However, a goal of the invention is to improve granularity, so that at any point in the time, the timing will be closer to the ideal case. Therefore, a 10, 10, and 12 timing will generally used over a 8, 8, and 16 timing.

Figure 9:
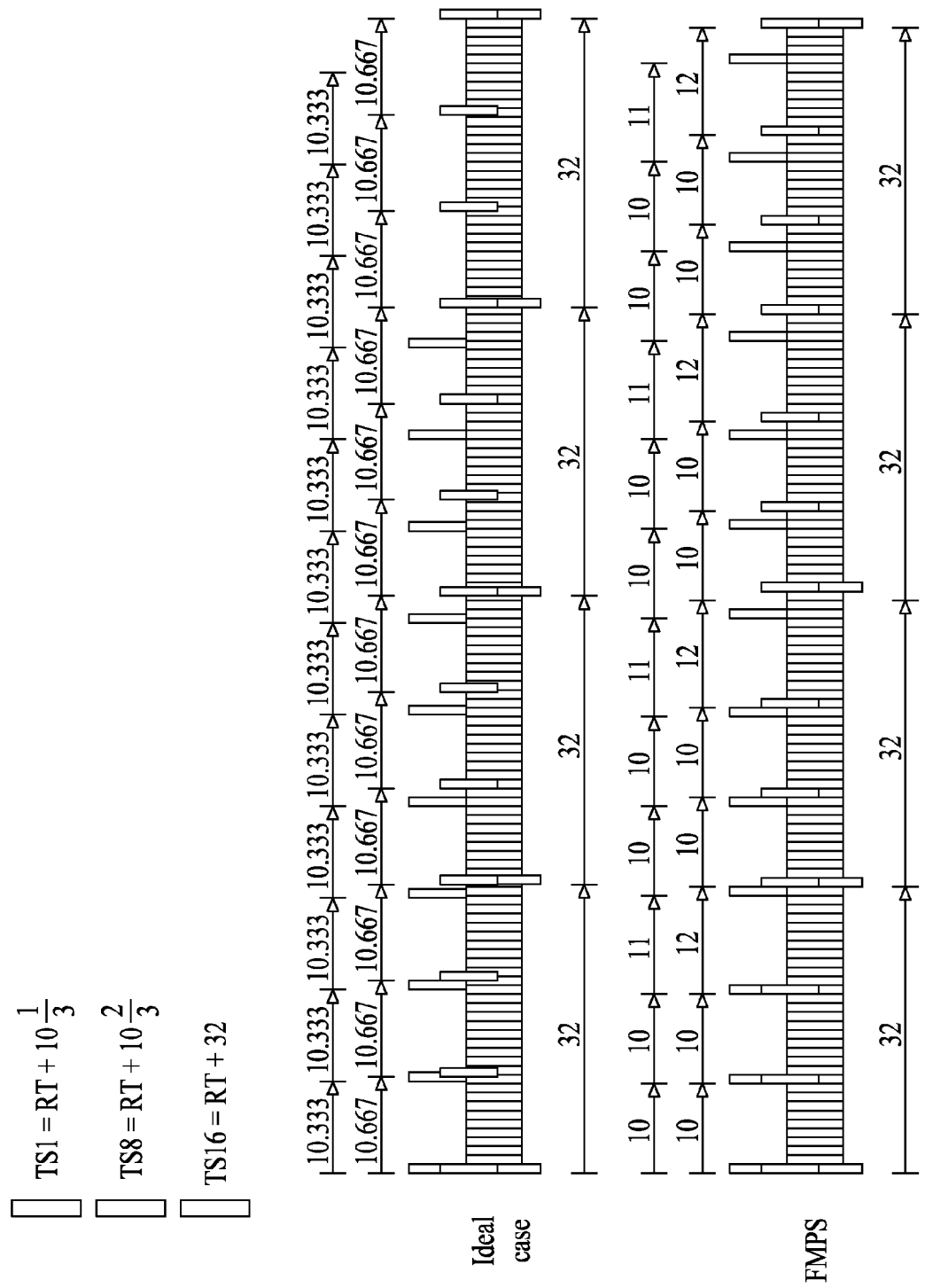
FIG. 9 shows timing diagrams for three time stamp expressions.

FIG. 9 shows timing diagrams for TS1, TS8, and TS16 of FIG. 7. The ideal and fuzzy time stamp timings are provided. For the ideal case, TS1 has departure times every 10.333 time units, TS8 has departure times every 10.667 time units, and TS16 has departure times every 32 time units. For the fuzzy time stamp timings, TS1 will be in a sequence 10, 10, and 11. TS8 will be in a sequence 10, 10, and 12. TS16 will be every 32 time units, which is the same as the ideal case. Therefore, after every 32 time units, the fuzzy time stamp timings and ideal case timings are synchronized.

Figure 10:
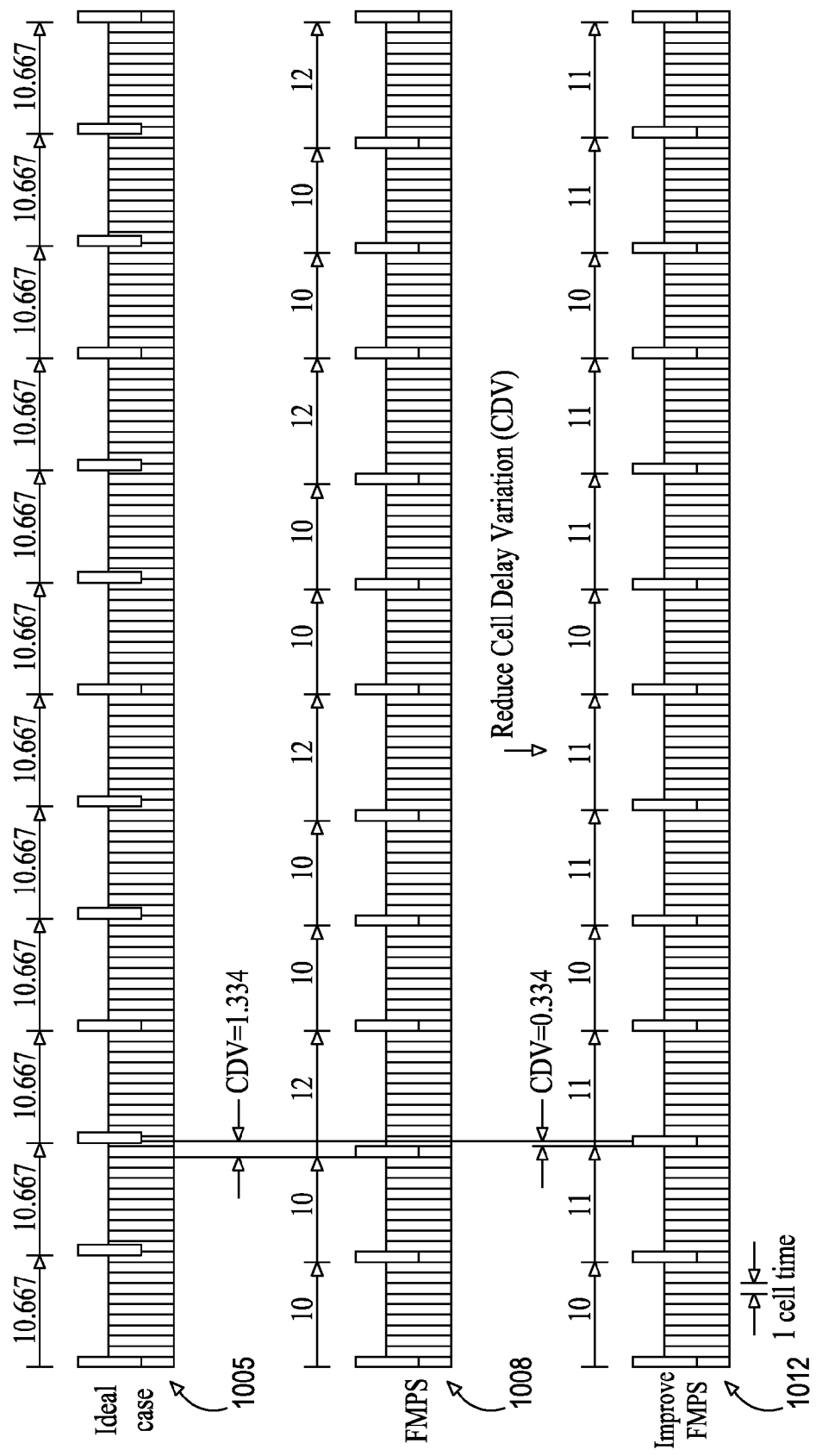
FIG. 10 shows a technique of improving the granularity of the timing by reducing cell delay variation (CDV).

FIG. 10 illustrates a technique of improving the granularity of the timing. This approach may be referred to as a reducing cell delay variation (CDV) technique. The figure shows timing for TS8. Each block represents a single time unit. Granularity is a measure of how close a departure time is to its ideal departure time. The better the granularity, the closer the actual departure time is to its ideal. Poor granularity will increase cell delay variation. Bigger cell delay variation cause larger jitter, and increases buffer size to absorb or address the jitter.

Timing diagram 1005 shows the ideal case, where departure times occur every 10.667 time units. Timing diagram 1008 shows one result using a fuzzy time stamp technique. Timing diagram 1012 shows another result using the fuzzy time stamp technique, but with a technique to reduce the cell delay variation. Reducing CDV, the sequence of departure times becomes 10, 11, and 11. Each of the departure times will be closer to the ideal in 1005 than in for timing diagram 1008. Therefore, granularity is improved.

Figure 11:
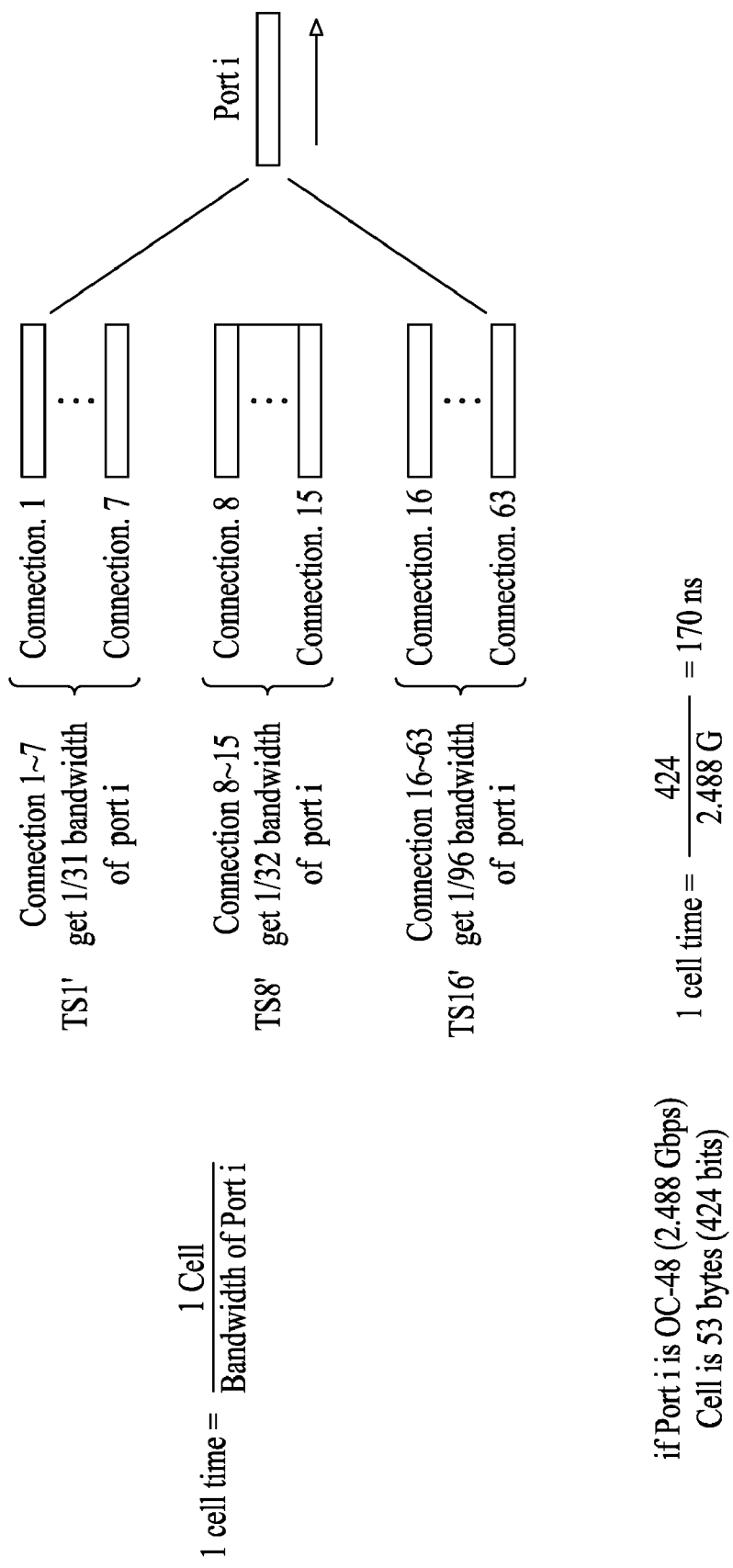
FIG. 11 provides an example of a specific application of the invention to OC-48 technology.

FIG. 11 provides an example of a specific application of the invention to OC-48 technology. An OC-48 port provides a 2.488 gigabit-per-second connection. TS1' is for connections 1 to 7, which get 1/31 bandwidth of port i. TS8' is for connections 8 to 15, which get 1/32 bandwidth of port i. TS16' is for connections 16 to 63, which get 1/96 bandwidth of port i.

One cell time will be give by one cell divided by the bandwidth of port i. So, when port I is OC-48 or 2.488 gigabits per second, the cell is 53 bytes of 424 bits (i.e., 8 bits per byte). One cell time will be 424 divided by 2.488 gigabits per second, which will be 170 nanoseconds.

Figure 12:
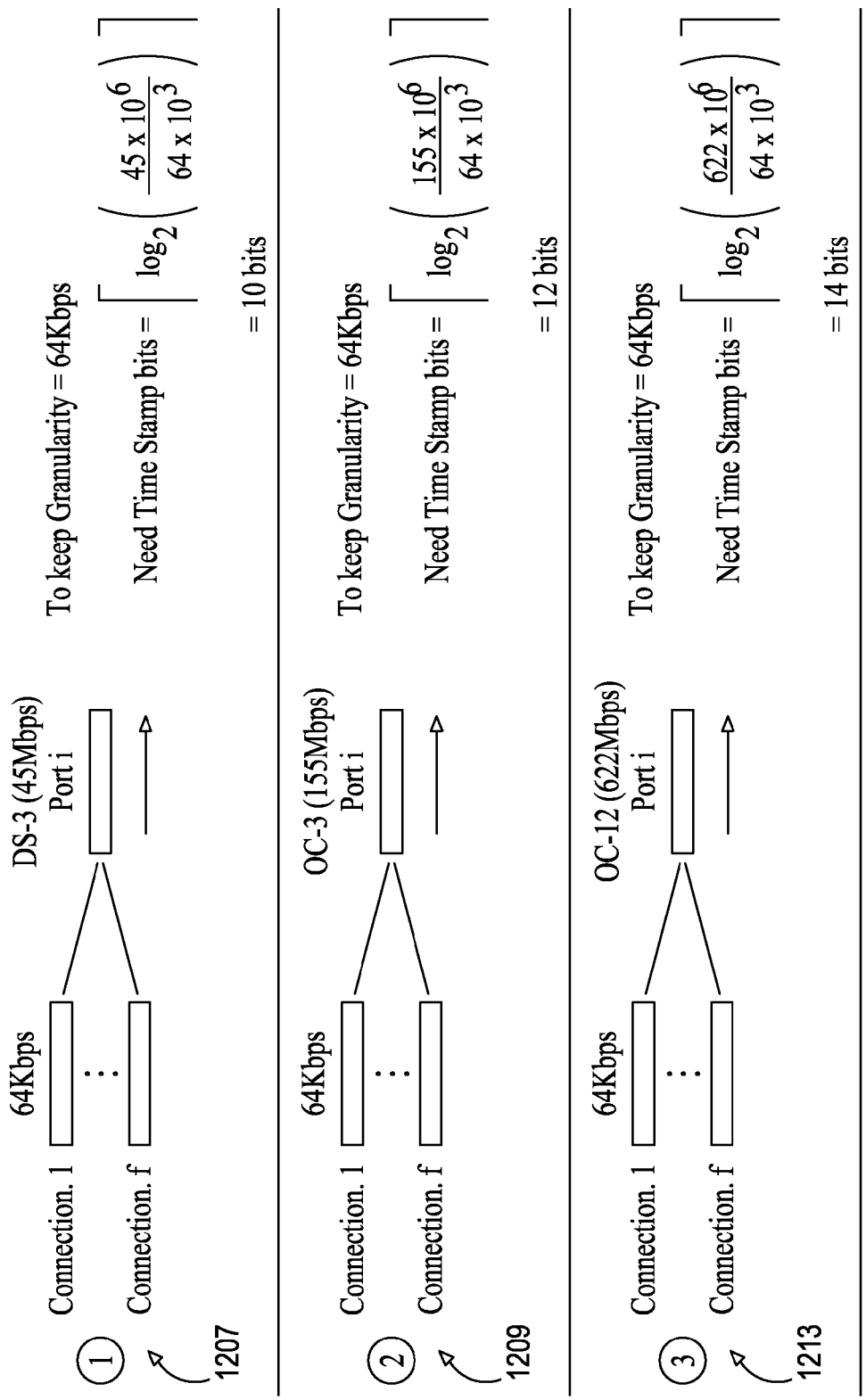
FIG. 12 shows applications of the technique to DS-3, OC-3, and OC-12 technologies.

FIG. 12 shows applications of the technique to DS-3, OC-3, and OC-12 technologies. Calculations are provided for DS-3 in row 1207, OC-3 in row 1209, and OC-12 in row 1213. The number of time stamp bits is given by the logarithm (base 2) of the port bandwidth divided by the granularity desired.

For example, for DS-3, where the bandwidth is 45 megabits per second, if the desired granularity is 64 kilobits per second, the time stamp bits needed will be 10. For OC-3, where the bandwidth is 155 megabits per second, if the desired granularity is 64 kilobits per second, the time stamp bits needed will be 12. For OC-12, where the bandwidth is 622 megabits per second, if the desired granularity is 64 kilobits per second, the time stamp bits needed will be 14.

As can be appreciated, as the bandwidth increases, so does the needed number of time stamp bits at the same granularity level. To improve the granularity, which means making the granularity finer, the number of time stamp bits needed, at the same bandwidth, will increase.

Figure 13:
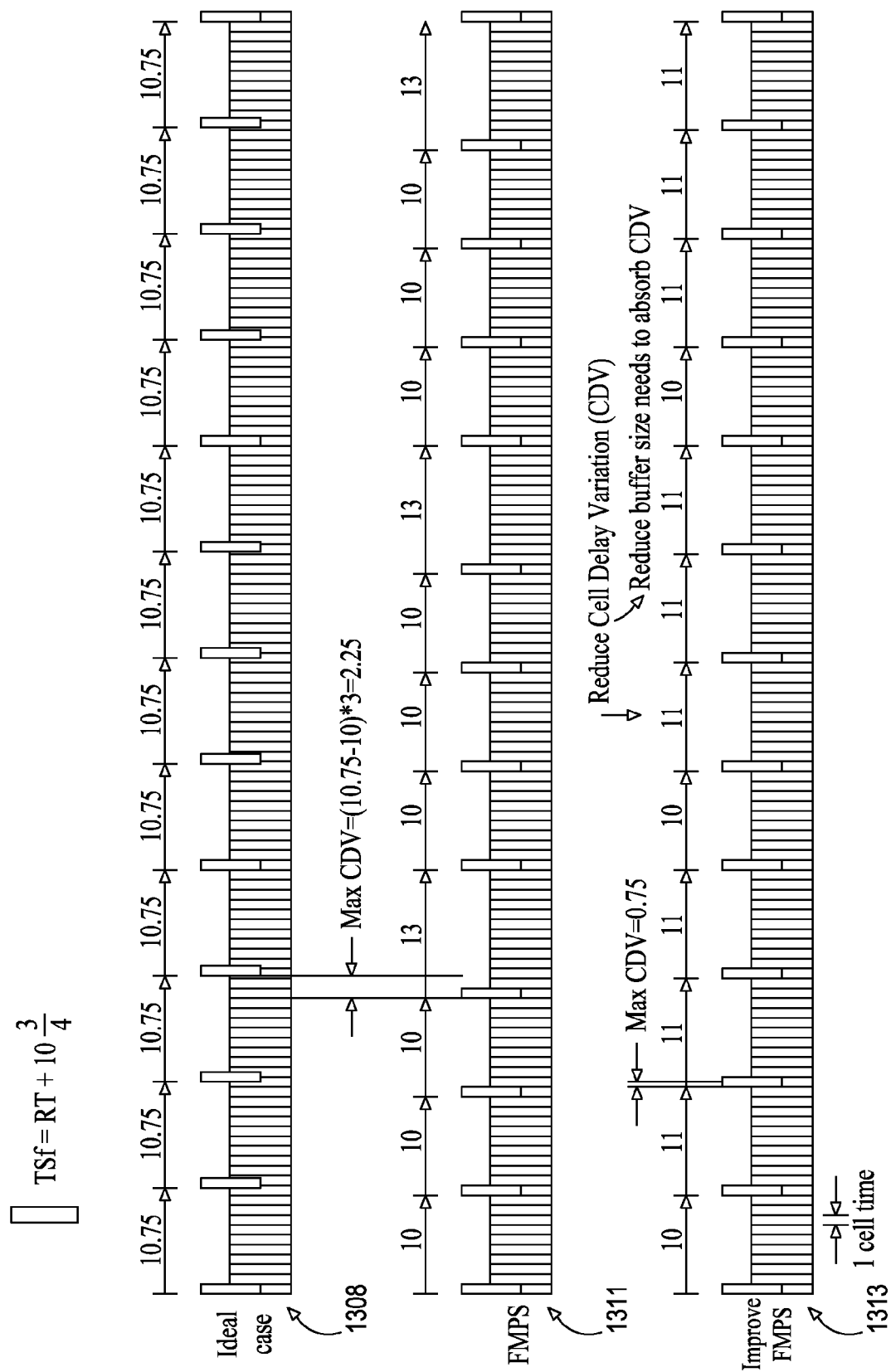
FIG. 13 shows maximum cell delay variation values for some time stamp diagrams.

FIG. 13 shows maximum cell delay variation values for some time stamp diagrams. The timing diagrams are for a time stamp TSf of RT plus 10¾. Timing diagram 1308 is for the ideal case, where departure times occur every 10.75 time units. Timing diagram 1311 for the fuzzy time stamp technique presented in FIG. 5, where departure times occur in the sequence 10, 10, 10, and 13. Timing diagram 1311 synchronizes with the ideal cases every 43 time units.

For the approach in timing diagram 1311, a maximum cell delay variation is 2.25 time units (which is the given by 3*(10.75−10)). This means the worst case timing difference between the ideal case and this fuzzy time stamp timing 1311 will be 2.25 time units. A buffer may be used to store data in order to absorb this cell delay variation.

Timing diagram 1316 is for a fuzzy time stamp technique where the cell delay variation is reduced. In this approach, the sequence also totals 43 time units, like the 1311 timing diagram. The departure times occur in the sequence 10, 11, 11, and 11.

For the approach in timing diagram 1316, a maximum cell delay variation is 0.75 time units. This means the worst case timing difference between the ideal case and this fuzzy time stamp timing 1316 will be 0.75 time units, which means it has better granularity than approach for timing diagram 1311. Therefore, a buffer used to store the data in order to absorb the 0.75 cell delay variation will be smaller than the 2.25 cell delay variation case, thus reducing buffer size.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method for data networking comprising:
providing a first connection and a second connection, each capable of connecting to pass data to a network port;
providing a first fractional time stamp expression for the first connection; and
allocating the network port to the first connection for X blocks of time based on the first fractional time stamp expression, wherein X is at least two, a first of the X blocks has M time units, a second of the X blocks has N time units, and M is not equal to N, and
a number of bits used to represent the fractional time stamp expression will be a logarithm, base 2, of a bandwidth of the network port divided by a selected granularity.

2. The method of claim 1 comprising:
providing a second fractional time stamp expression for the second connection.

3. The method of claim 1 wherein one time unit comprises one cell size divided by a bandwidth of the network port.

4. The method of claim 1 wherein the port is at least one of a DS-3, OC-3, OC-12, or OC-48 port connection.

5. The method of claim 1 further comprising:
sorting the first and second connection using the fractional time stamp value.

6. The system of claim 1 wherein a first time the first connection is connected to the port for a time period different from that for a second time the first connection is connected to the port.

7. The method of claim 1 wherein the fractional time stamp expression is derived by scaling down a corresponding nonfractional time stamp value by a user-selected factor.

8. The method of claim 7 wherein the fractional time stamp value is represented using fewer binary bits than the corresponding nonfractional time stamp value.

9. A system comprising:
a port having a first bandwidth;
a plurality of connections, each capable of connecting to pass data to the port; and
a controller, wherein the controller connects a first connection, having a second bandwidth, of the connections to the port for a time period which is based on a fractional time stamp value calculated using time value plus the first bandwidth divided by the second bandwidth, and a number of bits used to represent the fractional time stamp expression will be a logarithm, base 2, of a bandwidth of the port divided by a selected granularity.

10. The system of claim 9 wherein the port is at least one of a DS-3, OC-3, OC-12, or OC-48 port connection.

11. The system of claim 9 wherein a first time the first connection is connected to the port for a time period different from that for a second time the first connection is connected to the port.

12. The system of claim 9 where the controller performs sorting using the fractional time stamp value.

13. The system of claim 9 wherein the fractional time stamp value is derived by scaling down a corresponding nonfractional time stamp value by a user-selected factor.

14. The system of claim 13 wherein the fractional time stamp value is represented using fewer binary bits than the corresponding nonfractional time stamp value.

15. A method for data networking comprising:
providing a first connection and a second connection, each capable of connecting to pass data to a network port;
providing a scale-down factor Z;
providing a first time stamp expression for the first connection;
scaling down the first time stamp expression using the scale-down factor Z, wherein the first time stamp expression becomes fractional and includes a quantity X plus Y/Z, where X is an integer, Y is a numerator, and Z is a denominator; and
allocating the network port to the first connection for Z time periods, wherein at least Y of the Z time periods has X time units and one of the Z time periods has (X+Y) time units.

16. The method of claim 15 wherein a value for Z is provided by a user.

17. The method of claim 15 further comprising:
sorting the first and second connection using the fractional time stamp value.

18. The method of claim 15 comprising:
scaling down the second time stamp expression using the scale-down factor Z.

19. The method of claim 15 wherein the Z time periods has a total of (Z*X+Y) time units.

20. The method of claim 15 wherein the second time stamp expression is not fractional.

* * * * *